United States Patent
Ryon et al.

(10) Patent No.: US 11,369,985 B2
(45) Date of Patent: Jun. 28, 2022

(54) FLUID CONDUITS WITH HEAT SHIELDING

(71) Applicant: Delavan Inc., West Des Moines, IA (US)

(72) Inventors: Jason Ryon, Carlisle, IA (US); Lev A. Prociw, Johnston, IA (US)

(73) Assignee: Delavan Inc, West Des Moines, IA (US)

( * ) Notice: Subject to any disclaimer, the term of this patent is extended or adjusted under 35 U.S.C. 154(b) by 208 days.

(21) Appl. No.: 16/593,674

(22) Filed: Oct. 4, 2019

(65) Prior Publication Data
US 2021/0101168 A1    Apr. 8, 2021

(51) Int. Cl.
| | |
|---|---|
| *B23P 15/26* | (2006.01) |
| *B33Y 10/00* | (2015.01) |
| *B33Y 80/00* | (2015.01) |
| *F02C 7/22* | (2006.01) |
| *F02C 7/24* | (2006.01) |
| *B05B 15/14* | (2018.01) |

(52) U.S. Cl.
CPC .............. *B05B 15/14* (2018.02); *B23P 15/26* (2013.01); *B33Y 10/00* (2014.12); *B33Y 80/00* (2014.12); *F02C 7/222* (2013.01); *F02C 7/24* (2013.01); *F05D 2220/32* (2013.01); *F05D 2230/60* (2013.01); *Y10T 29/49361* (2015.01)

(58) Field of Classification Search
CPC . F02C 7/22; F16L 59/14; F16L 59/143; F16L 9/18; F16L 9/19; F16L 9/20; F23R 3/283; F28D 7/10; F28F 1/003
See application file for complete search history.

(56) References Cited

U.S. PATENT DOCUMENTS

| | | | | |
|---|---|---|---|---|
| 4,735,044 A | * | 4/1988 | Richey ...................... | F02C 7/22 239/424 |
| 5,598,696 A | * | 2/1997 | Stotts ........................ | F02C 7/22 60/740 |
| 6,761,035 B1 | * | 7/2004 | Mueller .................... | F02C 7/22 239/397.5 |
| 7,559,142 B2 | * | 7/2009 | Patel ........................ | F02C 3/145 29/416 |

(Continued)

FOREIGN PATENT DOCUMENTS

| | | | |
|---|---|---|---|
| EP | 3109548 A1 | 12/2016 | |
| EP | 3770502 A1 * | 1/2021 | ................ F23R 3/28 |

(Continued)

OTHER PUBLICATIONS

Extended European Search Report dated Jul. 22, 2020, issued during the prosecution of European Patent Application No. EP 19215270.0.

*Primary Examiner* — Jacob J Cigna
(74) *Attorney, Agent, or Firm* — Locke Lord LLP; Joshua L. Jones; Scott D. Wofsy (57) ABSTRACT

A method includes forming fluid conduit inside a heat shield in an additive manufacturing process, removing powder from an interior passage of the fluid conduit and from an insulation gap defined between the fluid conduit and the heat shield, separating the heat shield and fluid conduit from the build platform, and shifting the fluid conduit to a shifted position relative to the heat shield. The method includes securing the fluid conduit to the heat shield in the shifted position.

9 Claims, 9 Drawing Sheets

(56) References Cited

U.S. PATENT DOCUMENTS

| | | | |
|---|---|---|---|
| 8,210,211 B2* | 7/2012 | McMasters | F23R 3/14 |
| | | | 138/115 |
| 9,759,356 B2 | 9/2017 | Ott et al. | |
| 9,784,187 B2* | 10/2017 | Wolfe | F01D 25/00 |
| 9,791,153 B2* | 10/2017 | Dai | F23R 3/60 |
| 9,857,002 B2* | 1/2018 | Ott | F16L 39/005 |
| 9,915,480 B2 | 3/2018 | Ott et al. | |
| 9,939,087 B2* | 4/2018 | Kolarski | F16L 59/143 |
| 10,513,983 B2* | 12/2019 | Butcher | F02C 7/222 |
| 10,695,837 B2* | 6/2020 | Haevaker | F23D 14/22 |
| 10,934,890 B2* | 3/2021 | Ott | B22F 10/20 |
| 11,117,155 B2* | 9/2021 | Ryon | B33Y 10/00 |
| 2009/0000681 A1* | 1/2009 | Averbuch | F16L 9/18 |
| | | | 138/112 |
| 2016/0003157 A1 | 1/2016 | Ott et al. | |
| 2016/0208708 A1* | 7/2016 | Butcher | F02C 7/06 |
| 2016/0252252 A1* | 9/2016 | Dai | F23D 17/002 |
| | | | 60/740 |
| 2016/0305712 A1 | 10/2016 | Harris | |
| 2016/0312924 A1* | 10/2016 | Kolarski | F16L 53/37 |
| 2017/0219134 A1* | 8/2017 | Kedor | F16L 9/19 |
| 2018/0051884 A1* | 2/2018 | Stytsenko | F23R 3/36 |
| 2018/0058771 A1 | 3/2018 | Butcher et al. | |
| 2018/0214954 A1* | 8/2018 | Haevaker | B22F 10/20 |
| 2020/0109668 A1* | 4/2020 | Butcher | B33Y 80/00 |
| 2021/0025329 A1* | 1/2021 | Ryon | F23R 3/283 |

FOREIGN PATENT DOCUMENTS

| | | | | |
|---|---|---|---|---|
| GB | 2440546 A * | 2/2008 | | B23K 26/127 |
| WO | 15/089033 A1 | 6/2015 | | |
| WO | WO-2018005106 A1 * | 1/2018 | | F15B 21/00 |

* cited by examiner

FLUID CONDUITS WITH HEAT SHIELDING

BACKGROUND

1. Field

The present disclosure relates to fluid conduits, and more particularly to fluid conduits such as used in fuel manifolds and injectors for gas turbine engines.

2. Description of Related Art

Fluid passages such as used for fuel need to be insulated from heat, e.g. in gas turbine engines. It is desirable to make fluid passages using additive manufacturing. However, the internal fluid passage must be supported during an additive process, and the supports thermally connect the conduit to the heat shield. This thermal connection undermines the heat shielding.

The conventional techniques have been considered satisfactory for their intended purpose. However, there is an ever present need for improved systems and methods for fluid conduits. This disclosure provides a solution for this need.

SUMMARY

A method includes forming fluid conduit inside a heat shield in an additive manufacturing process, removing powder from an interior passage of the fluid conduit and from an insulation gap defined between the fluid conduit and the heat shield, separating the heat shield and fluid conduit from the build platform, and shifting the fluid conduit to a shifted position relative to the heat shield. The method includes securing the fluid conduit to the heat shield in the shifted position.

During forming the fluid conduit inside the heat shield, at least a portion of each of the fluid conduit and heat shield can be aligned along a direction that exceeds the maximum build angle of the additive manufacturing process. During forming the fluid conduit inside the heat shield, at least a portion of each of the fluid conduit and heat shield can be aligned parallel to a build platform.

Forming the fluid conduit and heat shield can include forming a series of supports between the build platform and the fluid conduit. Forming the series of supports can include forming a series of apertures through the heat shield, wherein each support in the series of supports extends through a respective one of the apertures in the series of apertures. The supports can extend through the apertures to support the fluid conduit on the build platform during the build. Shifting the fluid conduit to the shifted position can include shifting the supports through the respective apertures until the supports extend externally from the heat shield. Shifting the supports can include shifting the supports until spacer features engage, spacing the heat shield from the fluid conduit. Securing the fluid conduit to the heat shield can include welding, bolting, and/or brazing the supports to the heat shield.

A system includes a fluid conduit within a heat shield. The fluid conduit includes a series of supports extending therefrom. The heat shield includes a series of apertures therethrough. Each support in the series of supports extends through a respective one of the apertures in the series of apertures.

The fluid conduit can define multiple separate flow channels therethrough. At least some of the apertures through the heat shield can be elongated to accommodate relative thermal expansion/contraction between the fluid conduit and the heat shield. The fluid conduit can define a ring shaped manifold with a plurality of radially inwardly extending feed arms extending inward from the manifold, wherein the heat shield extends about and shields the manifold and the feed arms. The manifold can be mounted to a combustor liner with studs passing through bores in the combustor liner, wherein the holes are each elongated in a respective radial direction to accommodate relative thermal expansion and contraction of the manifold and the combustor liner. The manifold can be slidingly engaged to the combustor liner to seal between the combustor liner and the manifold. The manifold can include a series of circumferentially spaced apart weight reduction features. A plurality of fluid nozzles can extend from each of the feed arms.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
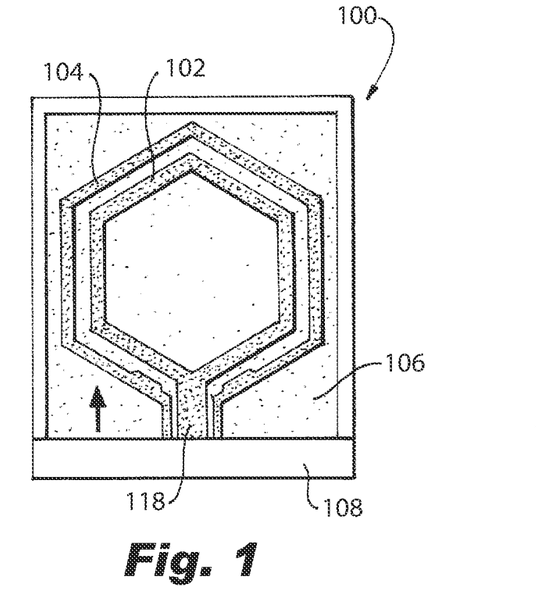
FIG. 1 is a schematic axial elevation view of an embodiment of a system constructed in accordance with the present disclosure, showing the heat shield and fluid conduit during additive manufacturing.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-14, as will be described. The systems and methods described herein can be used to additively manufacture fluid conduits with heat shielding, e.g. for fuel injection in gas turbine engines and the like.

Figure 2:
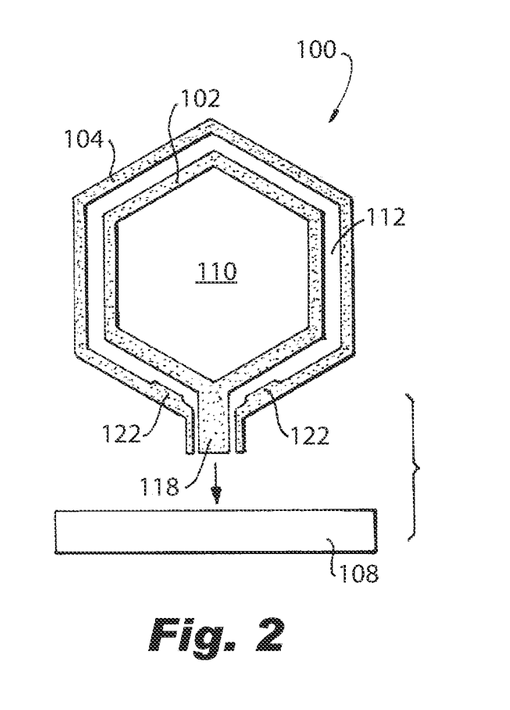
FIG. 2 is a schematic axial elevation view of the system of FIG. 1, showing the system after removal of unfused powder.
Figure 3:
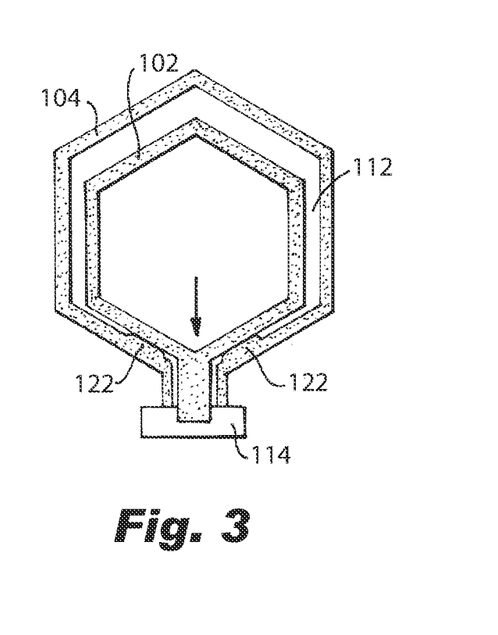
FIG. 3 is a schematic axial elevation view of the system of FIG. 1, showing the system after shifting the heat shield and fluid conduit relative to one another.

A method includes forming fluid conduit 102 inside a heat shield 104 in an additive manufacturing process, growing the fluid conduit 102 and heat shield 104 in the build direction as indicated by the heavy arrow, indicated in FIG. 1. FIG. 1 also shows unfused stock powder 106 accumulated in the build process. The build plate 108 can be separated from the heat shield 104 and the fluid conduit 102 after the build is complete, and the method includes removing the powder 106 from an interior passage 110 of the fluid conduit and from an insulation gap 112 defined between the fluid conduit and the heat shield, as shown in FIG. 2. As shown in FIG. 3, the method includes shifting the fluid conduit 102 to a shifted position relative to the heat shield 104, as indicated by the heavy arrow. The method includes securing the fluid conduit 102 to the heat shield 104 in the shifted position, e.g. by a welded component 114.

Figure 4:
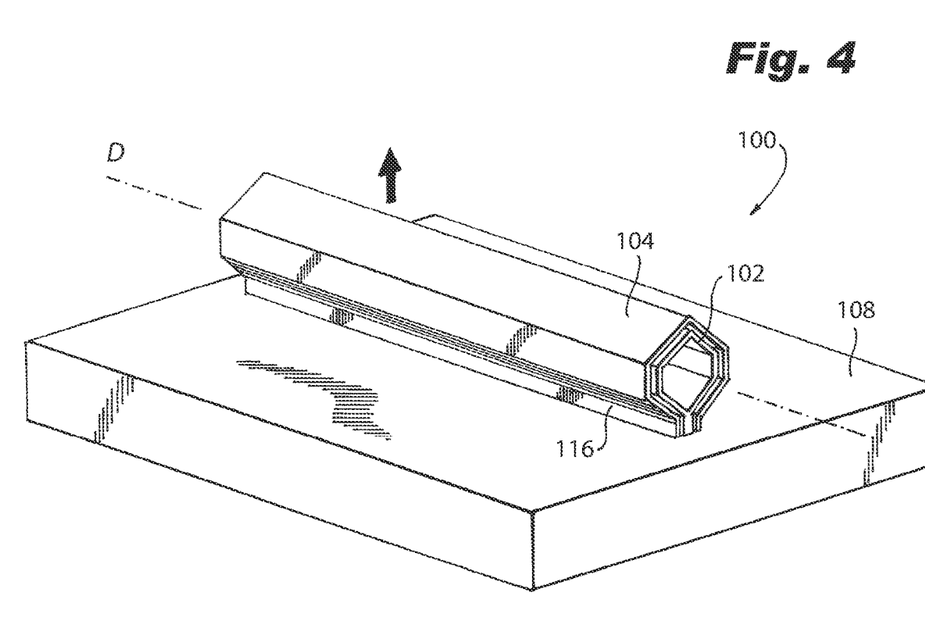
FIG. 4 is a perspective view of the system of FIG. 1, showing the heat shield and fluid conduit on a build platform or plate.

With reference now to FIG. 4, during forming the fluid conduit 102 inside the heat shield 104, at least a portion of each of the fluid conduit 102 and heat shield 104 can be aligned along a direction D that exceeds the maximum build angle of the additive manufacturing process. As shown in FIG. 4, the fluid conduit 102 and heat shield 104 are aligned parallel to a build platform 108.

Figure 5:
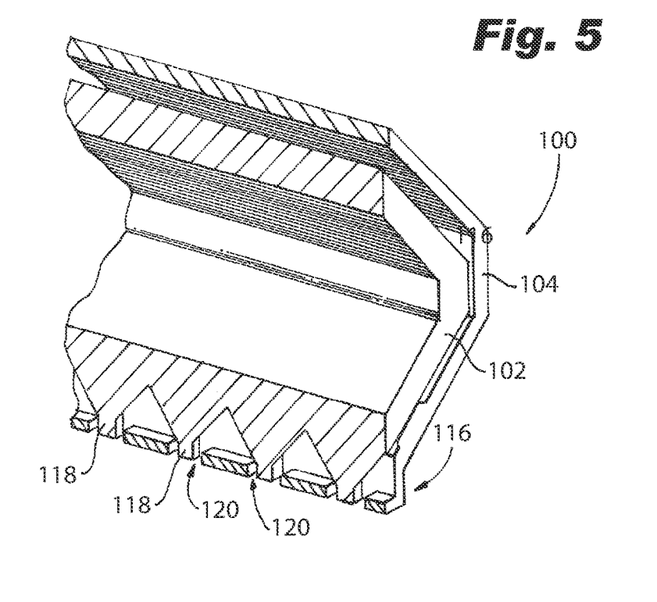
FIG. 5 is a cross-sectional perspective view of the system of FIG. 1, showing the supports of the fluid conduit extending through apertures in the heat shield.
Figure 6:
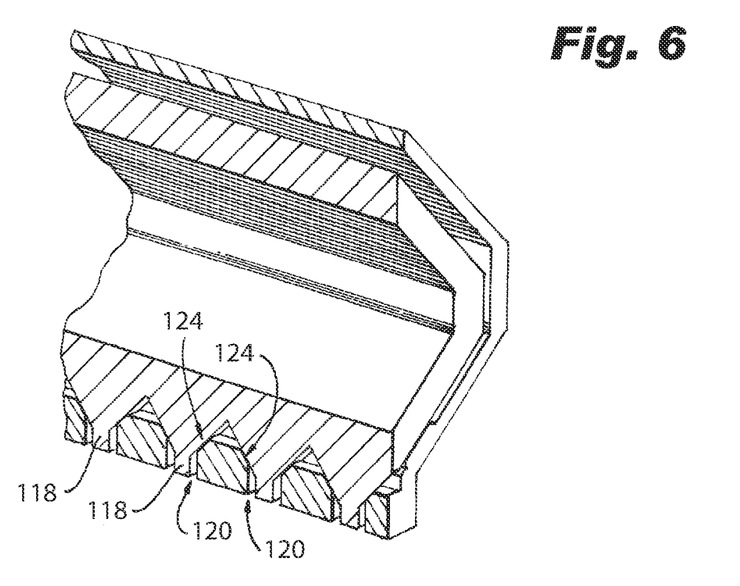
FIG. 6 is a cross-sectional perspective view of a portion of the system of FIG. 1, showing another embodiment of apertures through the heat shield, with sealing surfaces.

With reference now to FIG. 5, there is a spine 116 formed in the heat shield 104 and the fluid conduit 102 for support from the build platform 108 during the build. Forming the spine 116 includes forming a series of supports 118 between the build platform 108 (not shown in FIG. 5, but see FIG. 4) and the fluid conduit 102. The spine 116 can also be formed to include a series of apertures 120 through the heat shield 104. Each support 118 extends through a respective one of the apertures 120, and all of the supports 118 and apertures lie in line along the spine 116. The supports 118 extend through the apertures 120 to support the fluid conduit 102 on the build platform 108 during the build as shown in FIGS. 1 and 2. Shifting the fluid conduit 102 into the shifted position shown in FIG. 3 can include shifting the supports 118 through the respective apertures 120 until the supports 118 extend externally from the heat shield as shown in FIG. 4. In the shifted position, spacer features 122 engage (shown in FIGS. 2-3), spacing the heat shield 104 from the fluid conduit 102 to maintain the gap 112. The contact of spacer features 122 and the fluid conduit 102 can be on a side of the system 100 that is subject to less temperature extremes, and contact resistance between the spacer features and the fluid conduit 102 helps insulate between the heat shield 104 and the fluid conduit 102. Securing the fluid conduit 102 to the heat shield 104 can include welding, bolting, and/or brazing the supports to the heat shield much as described with respect to FIG. 3. This can optionally include trimming the supports 118 to be flush with the exterior of the heat shield 104. As shown in FIG. 6, the apertures 120 in the heat shield 104 can be contoured or angled, forming sealing surfaces 124 that seal against the supports 118 to help maintain stagnant air in the gap 112.

Figure 7:
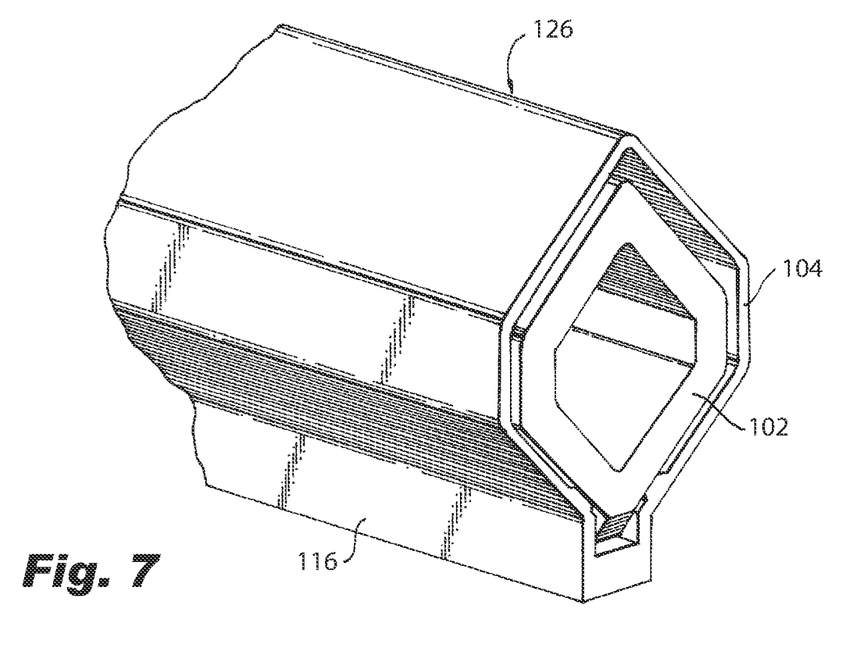
FIG. 7 is a cross-sectional perspective view of a portion of the system of FIG. 1, schematically showing accommodation of relative thermal expansion in the heat shield and fluid conduit.
Figure 9:
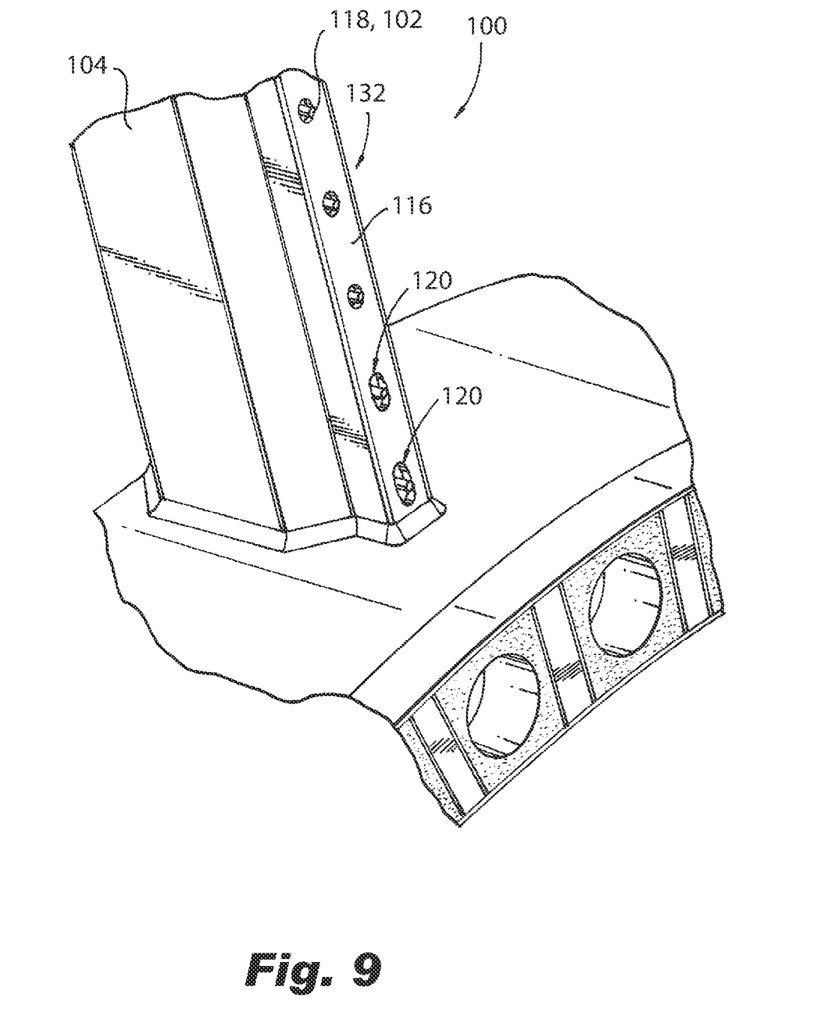
FIG. 9 is a perspective view of a portion of the system of FIG. 1, showing elongated apertures through the heat shield to accommodate relative thermal expansion of the heat shield and fluid conduit.

With reference now to FIG. 7, the heat shield 104 includes rounded edges 126 running opposite the spine 116, and along the lateral sides of the heat shield 104. As the heat shield thermally expands, it translates up relative to the fluid conduit 102, as oriented in FIG. 7, but it is constrained by the fluid conduit 102. The resultant force on the heat shield 104 spacer features 122 tends to open the heat shield 104 outward, and flexure of the rounded edges 126 accommodates this. As shown in FIG. 9, at least some of the apertures 120 through the heat shield 104 can be elongated along the spine 116 to accommodate relative thermal expansion/contraction between the fluid conduit 102 and the heat shield 104.

Figure 8:
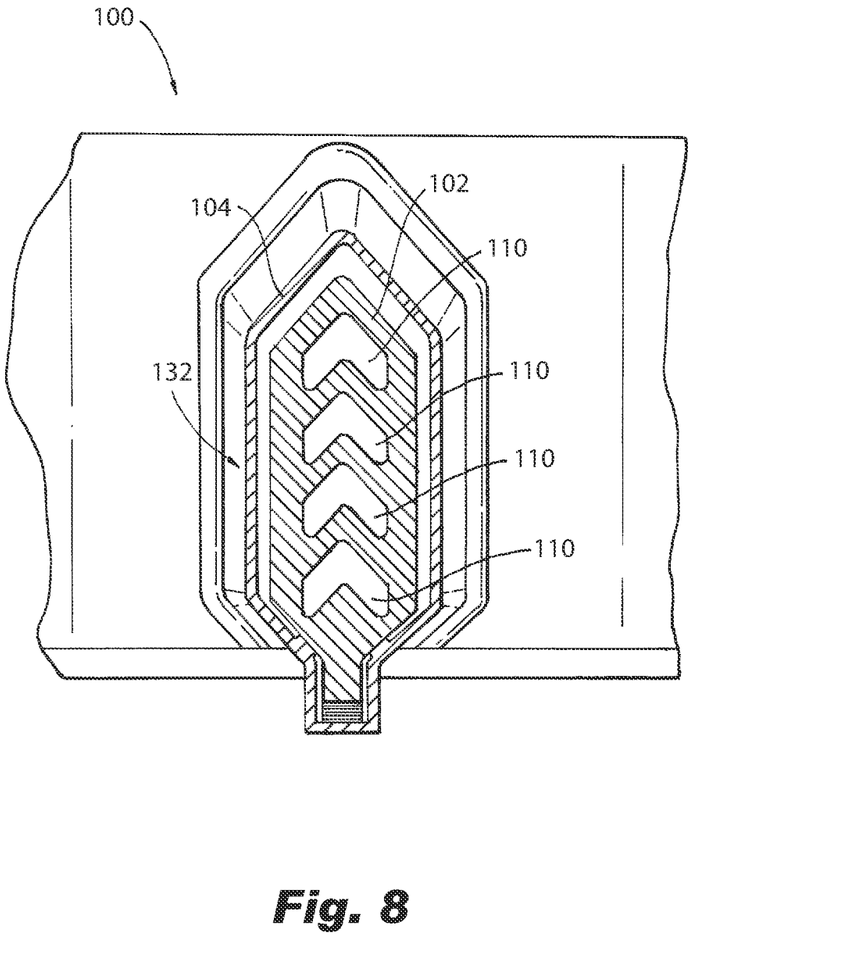
FIG. 8 is an axial elevation view of the system of FIG. 1, showing a version of the fluid conduit defining multiple fluid channels therethrough.

With reference now to FIG. 8, while the system 100 is described above as having a single flow channel 110 (labeled in FIG. 2) through the fluid conduit 102, it is also contemplated that there can be multiple flow channels 110 through the fluid conduit 102. Each flow channel 110 can be used for separate staging of fluid such as fuel, e.g., in a gas turbine engine.

Figure 10:
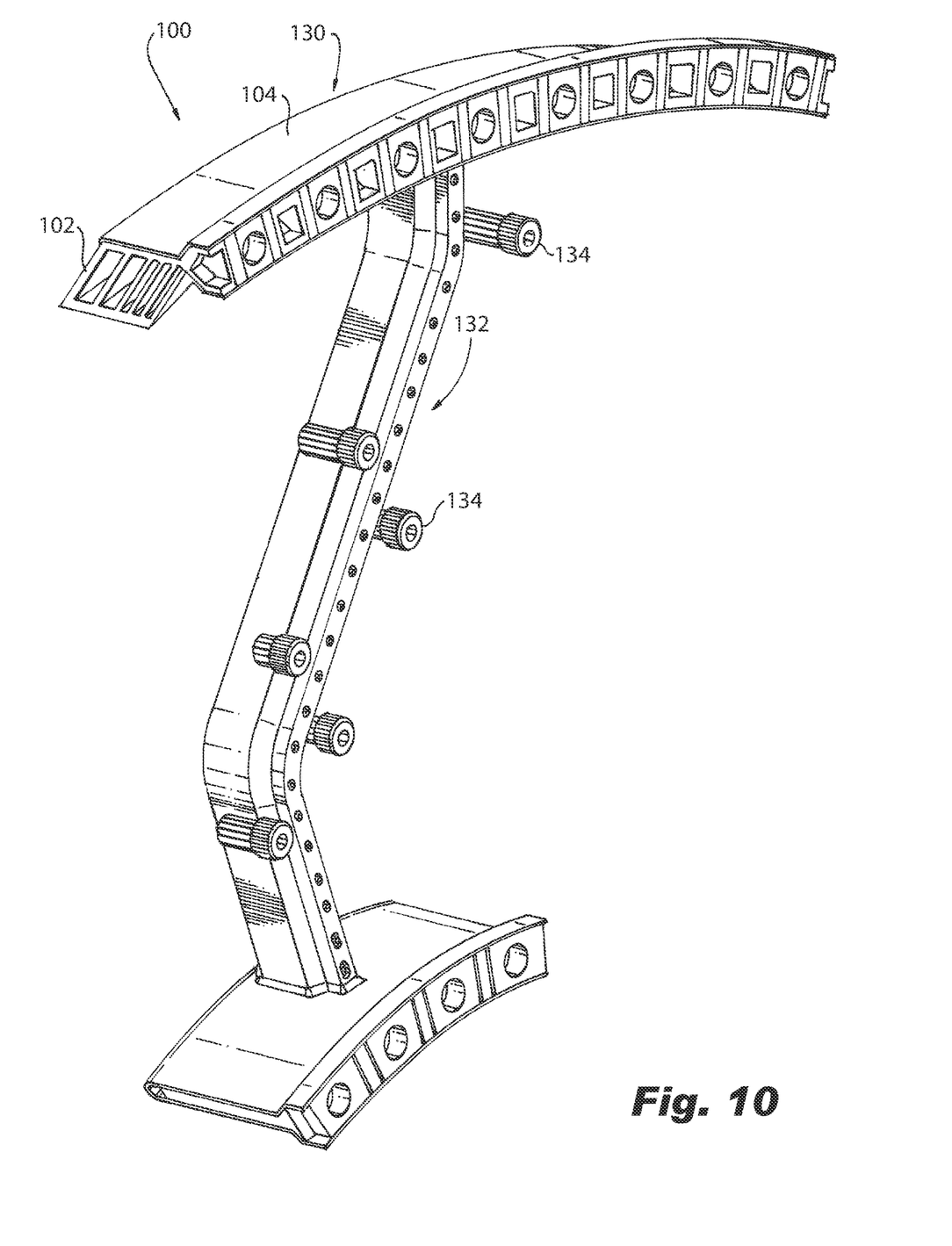
FIG. 10 is a perspective view of the system of FIG. 1, showing a portion of a version of the heat shield and conduit integrated into a manifold and feed arms.
Figure 11:
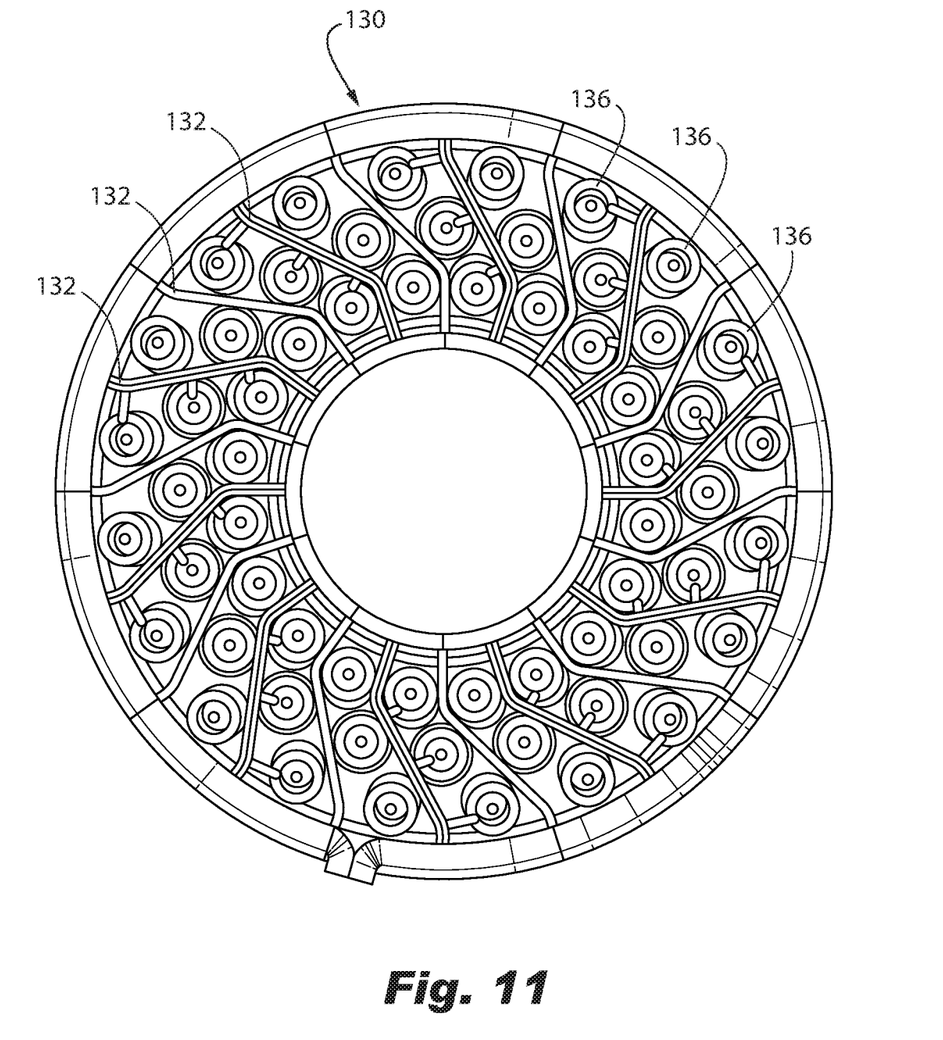
FIG. 11 is an elevation view of the manifold and feed arms of FIG. 10, showing the nozzles connected to the feed arms.
Figure 12:
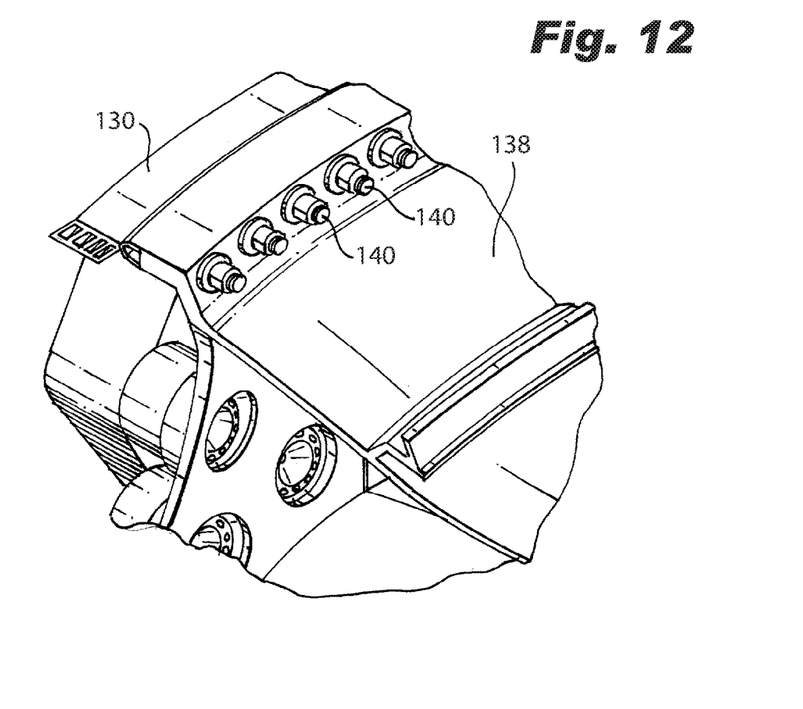
FIG. 12 is a cross-sectional perspective view of the manifold of FIG. 10, showing a combustor liner mounted to the manifold'
Figure 13:
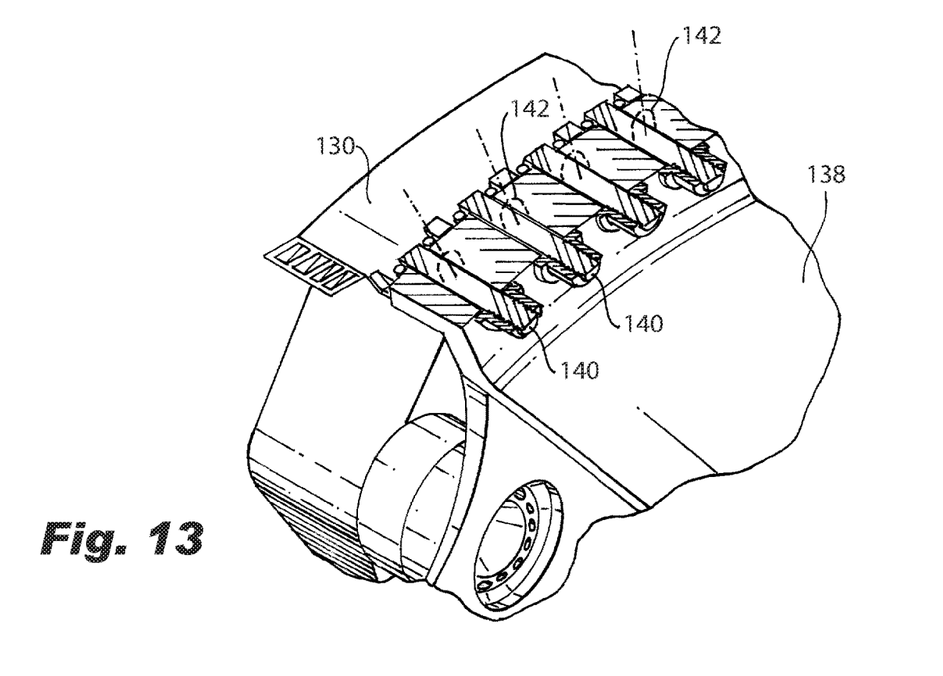
FIG. 13 is a cross-sectional perspective view of the manifold of FIG. 10, showing the studs in cross-section.
Figure 14:
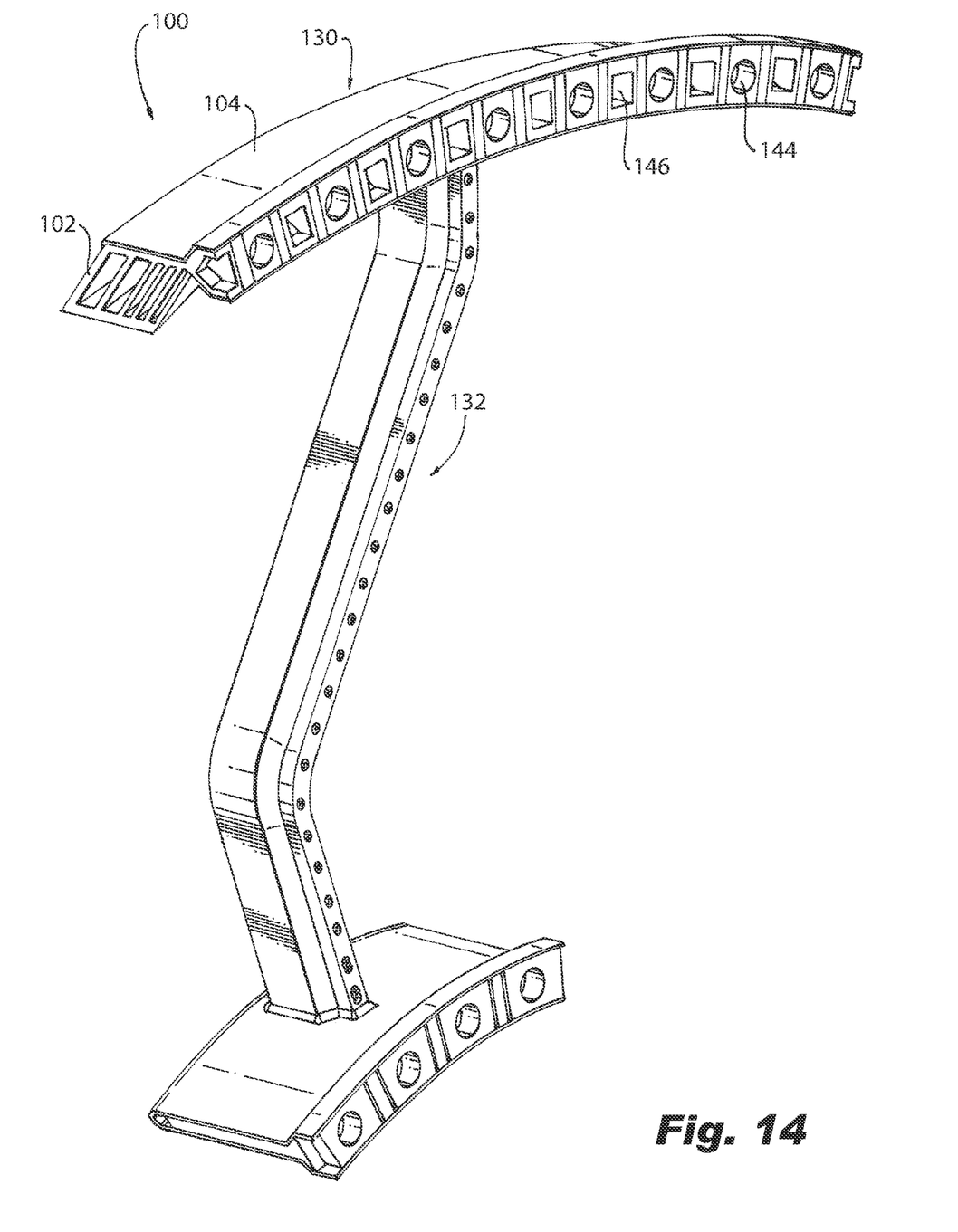
FIG. 14 is a perspective view of the system of FIG. 10, showing the bores for the studs as well as some weight reduction features.

With reference now to FIG. 10, the fluid conduit 102 define a ring shaped manifold 130 with a plurality of radially inwardly extending feed arms 132 extending inward from the manifold 130 (FIG. 10 shows one segment of a pattern which defines an entire ring as shown in FIG. 11). The heat shield 104 extends about and shields the manifold 130 and the feed arms 132. Branches 134 extend from the feed arms 132, which connect to a plurality of fluid nozzles 136 can extending from each of the feed arms 132, as shown in FIG. 11. As shown in FIGS. 11 and 12, the manifold 130 can be mounted to a combustor liner 138 with studs 140 passing through bores 142 in the combustor liner 138, wherein the bores 142 are each elongated in a respective radial direction to accommodate relative thermal expansion and contraction of the manifold 130 and the combustor liner 138. The manifold 130 can be slidingly engaged to the combustor liner 138 to seal between the combustor liner 138 and the manifold 130. As shown in FIG. 14, the manifold 130 can include a series of circumferentially spaced apart weight reduction features 146 spaced apart between the bores 144 for the studs 140.

The methods and systems of the present disclosure, as described above and shown in the drawings, provide for additive manufacture of fluid conduits with heat shielding. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   forming a fluid conduit inside a heat shield in an additive manufacturing process;
   removing powder from an interior passage of the fluid conduit and from an insulation gap defined between the fluid conduit and the heat shield;
   separating the heat shield and fluid conduit from a build platform;

shifting the fluid conduit to a shifted position relative to the heat shield; and securing the fluid conduit to the heat shield in the shifted position.

2. The method as recited in claim 1, wherein during forming the fluid conduit inside the heat shield, at least a portion of each of the fluid conduit and the heat shield are aligned along a direction that exceeds the maximum build angle of the additive manufacturing process.

3. The method as recited in claim 1, wherein during forming the fluid conduit inside the heat shield, at least a portion of each of the fluid conduit and the heat shield are aligned parallel to a build platform.

4. The method as recited in claim 1, wherein forming the fluid conduit and the heat shield includes forming a series of supports between the build platform and the fluid conduit.

5. The method as recited in claim 4, wherein forming the series of supports includes forming a series of apertures through the heat shield, wherein each support in the series of supports extends through a respective one of the apertures in the series of apertures.

6. The method as recited in claim 5, wherein the supports extending through the apertures support the fluid conduit on the build platform during the additive manufacturing process.

7. The method as recited in claim 6, wherein shifting the fluid conduit to the shifted position includes shifting the supports through the respective apertures until the supports extend externally from the heat shield.

8. The method as recited in claim 7, wherein shifting the supports includes shifting the supports until spacer features engage, spacing the heat shield from the fluid conduit.

9. The method as recited in claim 8, wherein securing the fluid conduit to the heat shield includes welding, bolting, and/or brazing the supports to the heat shield.

\* \* \* \* \*